Patented Oct. 10, 1933

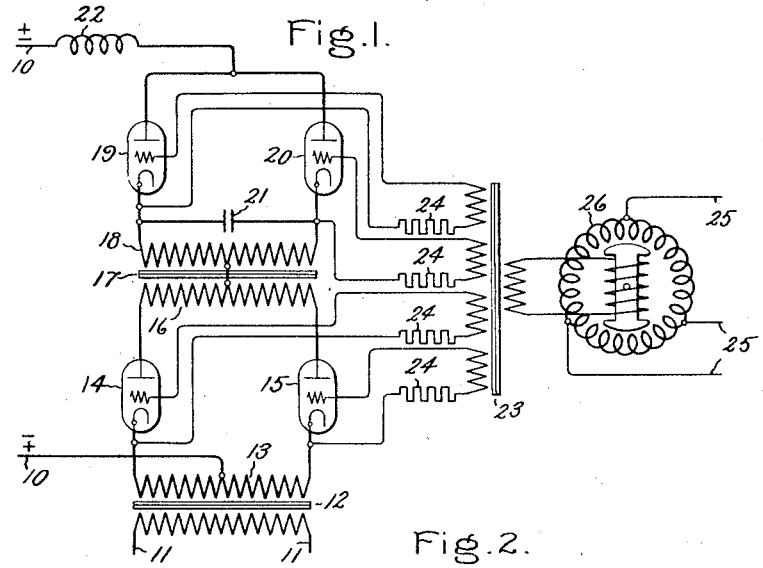

1,929,726

UNITED STATES PATENT OFFICE 1,929,726

ELECTRIC VALVE CONVERTING APPARATUS

Clodius H. Willis, Princeton, N. J., assignor to General Electric Company, a corporation of New York Application October 1, 1931. Serial No. 566,373

9 Claims. (Cl. 175—363)

My invention relates to electric valve converting apparatus and more particularly to such apparatus adapted to transmit energy between direct and alternating current circuits.

Heretofore, there have been devised numerous apparatus including electric valves for transmitting energy between direct and alternating current circuits. When operating such apparatus as a rectifier, transmitting energy from an alternating current circuit to a direct current circuit, it has been customary to control the average voltage of the direct current circuit by retarding the phase of the grid potentials of the several electric valves with respect to their anode potentials. The effect of this type of control is to draw a lagging current from the alternating current circuit while, on the other hand, it is usually preferable to draw a leading current in order to improve the power factor of the system. In the majority of the arrangements of the prior art, however, it has not been possible to operate such a controlled rectifier at leading power factors, since this type of operation involves the transfer of the load current from one valve to the next succeeding valve in opposition to the electromotive force of the inductive winding interconnecting the valves. On the other hand, when operating such apparatus as an inverter, transmitting energy from a direct current circuit to an alternating current circuit, it has not been possible ordinarily to supply lagging loads on the alternating current circuit without the provision of an inordinate amount of commutating capacitance. This is due to the fact that a lagging power factor on the alternating current circuit corresponds to a transfer of load current between the several electric valves at points in the cycle of alternating potential when the counter electromotive force of the inductive winding connected between the valves opposes such commutation. In my copending application, Serial No. 566,372, filed October 1, 1931, and in the copending application of C. A. Sabbah, Serial No. 566,377, filed October 1, 1931, assigned to the same assignee as the present application, there are disclosed and claimed certain electric valve converting apparatus for transmitting energy between direct and alternating current circuits under non-unity power factor conditions on the alternating current circuit. My invention comprises certain modifications and improvements of the arrangements described in the copending applications above referred to.

It is an object of my invention to provide an improved electric valve converting apparatus for transmitting energy between direct and alternating current circuits under any desired power factor conditions on the alternating current circuit.

It is another object of my invention to provide an improved electric valve converting apparatus for transmitting energy from a direct current supply circuit to an alternating current load circuit which will supply lagging loads to the alternating current circuit.

It is another object of my invention to provide an improved electric valve converting apparatus for transmitting energy from an alternating current supply circuit to a direct current load circuit which will draw leading current from the alternating current circuit.

It is a further object of my invention to provide an improved electric valve converting apparatus including a commutating capacitor adapted to be charged and discharged independently of the alternating current circuit for commutating the current between the valves under any desired power factor conditions on the alternating current circuit.

It is a still further object of my invention to provide an improved electric valve converting apparatus for transmitting energy between direct and alternating current circuits in which there is provided a commutating winding interconnecting the several electric valves in which is produced a potential for commutating the current between the valves under any desired power factor conditions on the alternating current circuit.

In accordance with my invention, an electric valve converting apparatus including an inductive winding and a plurality of electric valves interconnecting direct and alternating current circuits is provided with a commutating winding interposed in the connections between the electric valves and one side of the direct current circuit and electrically independent of the alternating current circuit. There is produced in this commutating winding an alternating potential synchronous with the alternating potential of the alternating current circuit and variable in phase in accordance with the phase of the alternating current. The potential produced in this winding is effective to commutate the current between the valves even when the electromotive force of the main inductive winding of the valve converting apparatus opposes such commutation, so that current may be transmitted between the direct and alternating current circuits under any desired power factor conditions on the alternating current circuit.

For a better understanding of my invention, together with other and further objects thereof, reference is had to the following description taken in connection with the accompanying drawing and its scope will be pointed out in the appended claims. Fig. 1 of the accompanying drawing illustrates my invention as embodied in a biphase half wave electric valve converting apparatus, in which the commutating potential is induced in the commutating winding by means of an auxiliary parallel inverter connected in series with the main valve converting apparatus, while Fig. 2 illustrates my invention as embodied in a single phase full wave electric valve converting apparatus in which the commutating potential is provided by an auxiliary electric valve inverter connected across the direct current circuit.

Referring now to Fig. 1 of the drawing, I have illustrated an arrangement for transmitting energy between a direct current circuit 10 and an alternating current circuit 11 under any desired power factor conditions on the alternating current circuit. This apparatus comprises a transformer 12 having one winding connected to the alternating current circuit 11 and a winding 13 provided with an electrical midpoint connected to one side of the direct current circuit 10 and a pair of end terminals connected to the other side of the direct current circuit 10 through electric valves 14 and 15. An inductive winding, or commutating winding, 16, interconnects the valves 14 and 15 on the side opposite to the transformer winding 13. The commutating winding 16 constitutes the secondary winding of the output transformer 17 of an auxiliary electric valve inverter of the type known in the art as a parallel inverter, comprising the winding 18, electric valves 19 and 20 and capacitor 21. By interconnecting the electrical midpoint of the windings 16 and 18, the auxiliary electric valve inverter is effectively in series with the direct current circuit. If desired, a smoothing reactor 22 may be connected in the direct current circuit. Each of electric valves 14 and 15, and 19 and 20 are provided with an anode, a cathode and a control grid and may be of any of the several types well-known in the art although I prefer to use valves of the vapor electric discharge type. The control grids of the several electric valves are connected to their respective cathodes through separate secondary windings of the grid transformer 23 and current limiting resistors 24. The primary winding of grid transformer 23 may be energized from any suitable source of alternating potential 25 through a rotary phase shifting transformer 26, by means of which power factor conditions on the alternating current circuit 11 may be controlled. In case the alternating current circuit 11 is energized from an independent source of electromotive force, obviously the circuit 25 must be synchronized therewith or the rotary phase shifting transformer 26 may be energized from the circuit 11 through any suitable phase splitting means.

Neglecting the commutating winding 16 and the auxiliary electric valve inverter comprising the winding 18, electric valves 19 and 20 and capacitor 21 and assuming that the upper direct current terminal is connected to the anodes of the valves 14 and 15, it will be seen that the above-described apparatus comprises essentially a biphase half wave valve converting apparatus (sometimes referred to as a single phase full wave converting apparatus.) With such an apparatus operating as a rectifier, it is well understood by those skilled in the art that the average voltage of the direct current circuit 10 may be controlled by retarding the phase of the grid potentials of electric valves 14 and 15 with respect to their anode potentials by means of the rotary phase shifting transformer 26. With this type of voltage control the rectifying apparatus becomes the equivalent of a lagging load on the alternating current circuit 11, while it is preferable to draw a leading current from the circuit 11 in order to improve the power factor of the system.

The auxiliary electric valve converting apparatus comprising the winding 18, electric valves 19 and 20 and capacitor 21 is of the type known in the art as a parallel inverter and is disclosed and broadly claimed in United States Letters Patent No. 1,800,002, granted April 7, 1931, upon the application of E. F. W. Alexanderson. In the operation of this apparatus, if one of the electric valves, for example 19, be rendered conductive, current will flow through this valve and the left-hand portion of the winding 18 to the other side of the direct current circuit. The current flowing in the left-hand portion of the winding 18 will induce a potential across the whole winding which charges the capacitor 21 to a potential substantially twice that of the direct current circuit. When the valve 20 is rendered conductive the capacitor 21 transfers the current between these two valves and in this manner the current is successively commutated between the valves 19 and 20, producing an alternating potential in the winding 18. It will be noted that the capacitor 21 is periodically charged to alternate polarities independently of the main transformer winding 13 so that its potential is independent of the phase relation of the potential of the winding 13. By exciting the grids of the valves 14 and 19 and 15 and 20 simultaneously, it is seen that the load current will flow during any half-cycle through similar portions of the windings 16 and 18 so that only the leakage reactance of the transformer 17 opposes the flow of load current through the apparatus. The potential across capacitor 21 and, hence, that appearing at the terminals of the winding 16, will lag behind the current flowing through the apparatus by substantially 90° so that substantially the maximum commutating potential is available at the instant of commutation irrespective of the potential of the winding 13 at that instant. Assume now that it is desired to transfer the current from the valve 14 to the valve 15 when the right-hand terminal of the winding 13 is positive with respect to the left-hand terminal so that the electromotive force of the winding 13 opposes commutation, a condition which corresponds to leading power factor conditions on the alternating current circuit 11. Under these conditions the maximum potential of the winding 16 is impressed between the anodes of the valves 14 and 15 so that, when the valve 15 is made conductive, the anode of the valve 14 will be negative with respect to its cathode and the current will be interrupted in this valve, as is well understood by those skilled in the art. It is seen that the potential of winding 13 opposing commutation under leading power factor conditions is equal to the maximum potential of this winding times the sine of the power factor angle so that, for moderate power factors on the alternating current circuit 11, the transformer 17 may be designed for voltage which is only a fraction of that of the transformer 12. However, if it is desired to operate the apparatus at substantially zero power factor on the alternating current circuit 11, the apparatus thus becoming analogous to a synchronous condenser, the transformer 17 must have a voltage rating somewhat greater than that of the transformer 12. If the transformer 17 is given a ratio of transformation slightly greater than unity, the load current flowing through one-half of the winding 16 will not be completely neutralized by that flowing through the corresponding portion of the winding 18, with the result that an additional current must flow in the other portion of the winding 18 and the only path for this additional current is through the capacitor 21. The result is that the capacitor 21 is effectively in series with a portion of the load current of the apparatus. With such an arrangement the alternating commutating potential has one parallel component substantially constant in magnitude and one series component increasing with the load on the apparatus; that is, the commutating potential is compounded with the load current to more satisfactorily commutate the current between the valves under heavy load conditions.

The operation of the above described apparatus as an inverter transmitting energy from the direct current circuit 10 to the alternating current circuit 11 is analagous to that just described. By means of the commutating winding 16 and its associated electric valve converting apparatus the current may be commutated between electric valves 14 and 15 when the counter electromotive force of the winding 13 opposes such commutation, a condition corresponding to lagging power factors on the alternating current circuit 11.

In Fig. 2 I have illustrated my invention as embodied in a single phase full wave valve converting apparatus. In this case the winding 13 of the transformer 12 is connected between the direct current circuit 10 through electric valves 14 and 15 and 14a and 15a, and commutating windings 16 and 16a respectively, and the auxiliary electric valve converting apparatus comprising the winding 18, electric valves 19 and 20, and the capacitor 21 is connected across the direct current circuit in parallel with the main converting apparatus, rather than in series as in the arrangement shown in Fig. 1. The operation of the arrangement in Fig. 2 is substantially identical with that described above in connection with Fig. 1 with the exception that there is no series compounding.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, means including a capacitor for commutating the current between said valves and means independent of said alternating current circuit for periodically charging said capacitor to alternate polarities.

2. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, a capacitor connected in parallel relationship with said apparatus, and means independent of said alternating current circuit for periodically charging said capacitor to alternate polarities for producing a periodic potential to commutate the current between said valves.

3. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, said valves being provided with control grids, means for exciting said grids to periodically render said valves alternately conductive and non-conductive, means including a capacitor for commutating the load current between said valves, and means independent of said alternating current circuit for periodically charging said capacitor to alternate polarities in synchronism with said grid excitation means.

4. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, a capacitor so connected that its terminal potential is available for commutating the current between said valves, and means independent of said alternating current circuit for periodically charging said capacitor to alternate polarities.

5. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, an auxiliary electric valve inverter energized from said direct current circuit and so connected that its output electromotive force is effective to commutate the load current between said valves, and means for periodically rendering said valves alternately conductive and non-conductive in synchronism with the alternating electromotive force of said inverter.

6. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, and an auxiliary electric valve inverter connected in series with said apparatus and so arranged that its output electromotive force is effective to commutate the load current between said valves.

7. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, and an auxiliary electric valve inverter connected across said direct current circuit in parallel with said apparatus and so related to said electric valves that its output electromotive force is effective to commutate the load current between them.

8. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, said electric valves being provided with control grids, an auxiliary electric valve inverter energized from said direct current circuit, said inverter comprising a second inductive winding, a commutating capacitor, and a plurality of other electric valves provided with control grids, said second inductive winding being so related to said first mentioned valves that its terminal potential is effective to commutate the load current between them, and means for synchronously exciting the grids of all of said valves to render them alternately conductive and non-conductive.

9. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, a commutating winding connected between said valves, an auxiliary electric valve inverter comprising a second inductive winding, a pair of other electric valves and a capacitor for commutating the current between them, said inverter being energized from said direct current circuit and having its inductive winding coupled with said commutating winding, and means for driving said inverter in synchronism with the current of said alternating current circuit and for varying the phase relation of the output potential of said inverter in accordance with the phase of said alternating current.

CLODIUS H. WILLIS.